Sept. 4, 1934.  E. L. LARISON  1,972,196
PHOSPHATIC MATERIAL
Filed Jan. 14, 1933
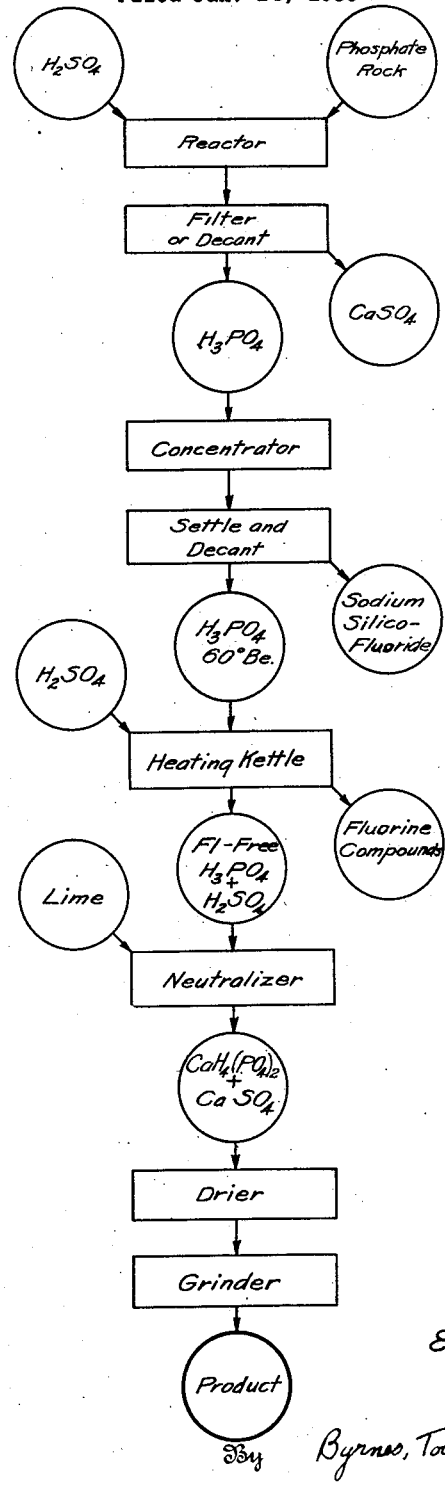
Inventor:
Eldon L. Larison
By Byrnes, Townsend & Potter
Attorneys.

Patented Sept. 4, 1934

1,972,196

UNITED STATES PATENT OFFICE 1,972,196

PHOSPHATIC MATERIAL

Eldon L. Larison, Anaconda, Mont.

Application January 14, 1933, Serial No. 651,787

5 Claims. (Cl. 23—109)

This invention relates to the production of phosphate material and particularly to the preparation of such material having a low fluorine content suitable for use in the feeding of live stock.

There are many places in the world where the soil is so deficient in phosphorus that the grass, hay and grain which are grown are in turn abnormally low in that element. In such regions, it is desirable to feed live stock, dependent on such forage, some material containing a high percentage of phosphorus in assimilable form. Bone meal is a commonly used material but its cost is high, its amount limited and its phosphorus content comparatively low.

Phosphate rock and phosphate limestone have been used and furnish the cheapest possible source of phosphorus. It has been demonstrated experimentally that the fluorine present in such material is very harmful to the animals eating it and consequently it cannot be used safely. Feeding tests have demonstrated that the ratio of fluorine to $P_2O_5$ in mineral supplements should be not more than 1 to 200. The same objection applies to ordinary acid phosphate or to treble superphosphate.

It has been found that a phosphatic material high in available phosphoric acid and very low in fluorine can be obtained by a novel method more particularly described below. Briefly, the method comprises the production of crude phosphoric acid by interacting sulphuric acid with phosphate rock and separating the resulting calcium sulphate from the phosphoric acid, removing fluorine from the crude phosphoric acid by heating the acid in the presence of sulphuric acid, and preferably converting the resulting phosphoric acid-sulphuric acid mixture to calcium phosphate and calcium sulphate, for example, by neutralizing the acids with lime.

The invention will be described for the purposes of illustration with reference to the accompanying drawing which is a flow sheet of a process embodying the principle of the invention.

Phosphate rock is treated with a sufficient amount of sulphuric acid to convert its calcium phosphate content to ortho phosphoric acid and calcium sulphate. The liquid phosphoric acid is separated in suitable manner from the solid calcium sulphate. The phosphoric acid is then concentrated by evaporation to about 60° Bé. during which operation a large amount of the fluorine present drops out as solid sodium silicofluoride which may be separated. The concentrated acid still retains from .5% to 1.0% fluorine largely as sodium silicofluoride in solution and in suspension.

It has been found that if such acid be heated until its boiling point is about 250° C. most of the fluorine is driven off as a vapor or gas. Such a temperature, however, converts the ortho acid to pyrophosphoric acid and the resulting product is almost solid when cold.

If, however, a relatively small amount of sulphuric acid be mixed with the 60° Bé. phosphoric acid, the fluorine can be largely eliminated by heating at a considerably lower temperature. The greater the amount of sulphuric acid used, the less need the temperature be. For example, if sulphuric acid is added in an amount equal to 30% of $P_2O_5$ in the phosphoric acid, most of the fluorine can be eliminated at 200–210° C.

It is easily possible by this means to reduce the fluorine content of the phosphoric acid to 0.1% or less.

If an amount of sulphuric acid equal to 60% of the $P_2O_5$ be added, the same reduction of fluorine in the product can be accomplished by heating to only 170–180° C.

A further advantage of this method of operation is that concentrated phosphoric acid which does not contain a considerable proportion of sulphuric acid is very corrosive to ordinary metals when near its boiling point, while phosphoric acid containing sulphuric acid amounting to 10% of its $P_2O_5$ content or more can be brought to its boiling point in iron vessels with very little corrosion to the latter.

The mixture of phosphoric and sulphuric acids produced as described above may be advantageously neutralized by mixing therewith ground burned lime in amount sufficient to convert the phosphoric acid to mono-calcium phosphate and the sulphuric acid to calcium sulfate. When the mixture is homogeneous, sufficient water is added to satisfy the requirements of crystallization together with a sufficient excess to render the mass miscible. The product may be allowed to air dry in piles for a short time, and is then dried and ground.

The material produced in this way contains over 40% available $P_2O_5$ and so little fluorine as to be harmless to animals which eat it as a supplement to their usual rations.

While it is possible to produce an ordinary acid phosphate by known methods which is sufficiently low in fluorine to be safe, such material contains only 16 to 20% $P_2O_5$ while the product made by my invention combines low ratio of fluorine to $P_2O_5$ and high $P_2O_5$ content resulting in important savings in transportation, bagging, and the like.

I claim:

1. A method of removing fluorine from crude phosphoric acid which comprises adding to the phosphoric acid sulphuric acid in an amount of from 10% to 60% of the $P_2O_5$ content of the phosphoric acid and heating at a temperature over 170° C. but below a temperature at which a substantial amount of pyrophosphoric acid is formed to remove fluorine.

2. A method of removing fluorine from crude phosphoric acid which comprises adding to the phosphoric acid sulphuric acid in an amount of about 30% of the $P_2O_5$ content of the phosphoric acid and heating at a temperature from about 200° to 210° C. to remove fluorine.

3. A method of making a phosphatic material suitable for feeding live stock comprising, reacting sulphuric acid with phosphate rock to liberate phosphoric acid, separating the phosphoric acid, concentrating the acid by evaporation, removing solids which separate out during the evaporation, heating the phosphoric acid with sulphuric acid in an amount of from 10 to 60% of the $P_2O_5$ content of the phosphoric acid at a temperature of over 170° C. but below a temperature at which a substantial amount of pyrophosphoric acid is formed to remove fluorine and neutralizing the resulting acid mixture.

4. A method of making a phosphatic material suitable for feeding live stock comprising, reacting sulphuric acid with phosphate rock to liberate phosphoric acid, separating the phosphoric acid, concentrating the acid by evaporation, removing solids which separate out during the evaporation, heating the phosphoric acid with sulphuric acid in an amount of about 30% of the $P_2O_5$ content of the phosphoric acid at a temperature of from about 200° to 210° C. to remove fluorine, and neutralizing the resulting acid mixture.

5. A method of making a phosphatic material suitable for feeding live stock comprising, reacting sulphuric acid with phosphate rock to liberate phosphoric acid, separating the phosphoric acid, concentrating the acid by evaporation, removing solids which separate out during the evaporation, heating the phosphoric acid with sulphuric acid in an amount of about 30% of the $P_2O_5$ content of the phosphoric acid at a temperature of from about 200° to 210° C. to remove fluorine, neutralizing the resulting acid mixture with lime, and drying and grinding the mixture of calcium phosphate and calcium sulphate thus produced.

ELDON L. LARISON.